(No Model.)
J. P. T. DAVIS.
DRIVE WHEEL FOR HARVESTERS OR BINDERS.
No. 508,167. Patented Nov. 7, 1893.
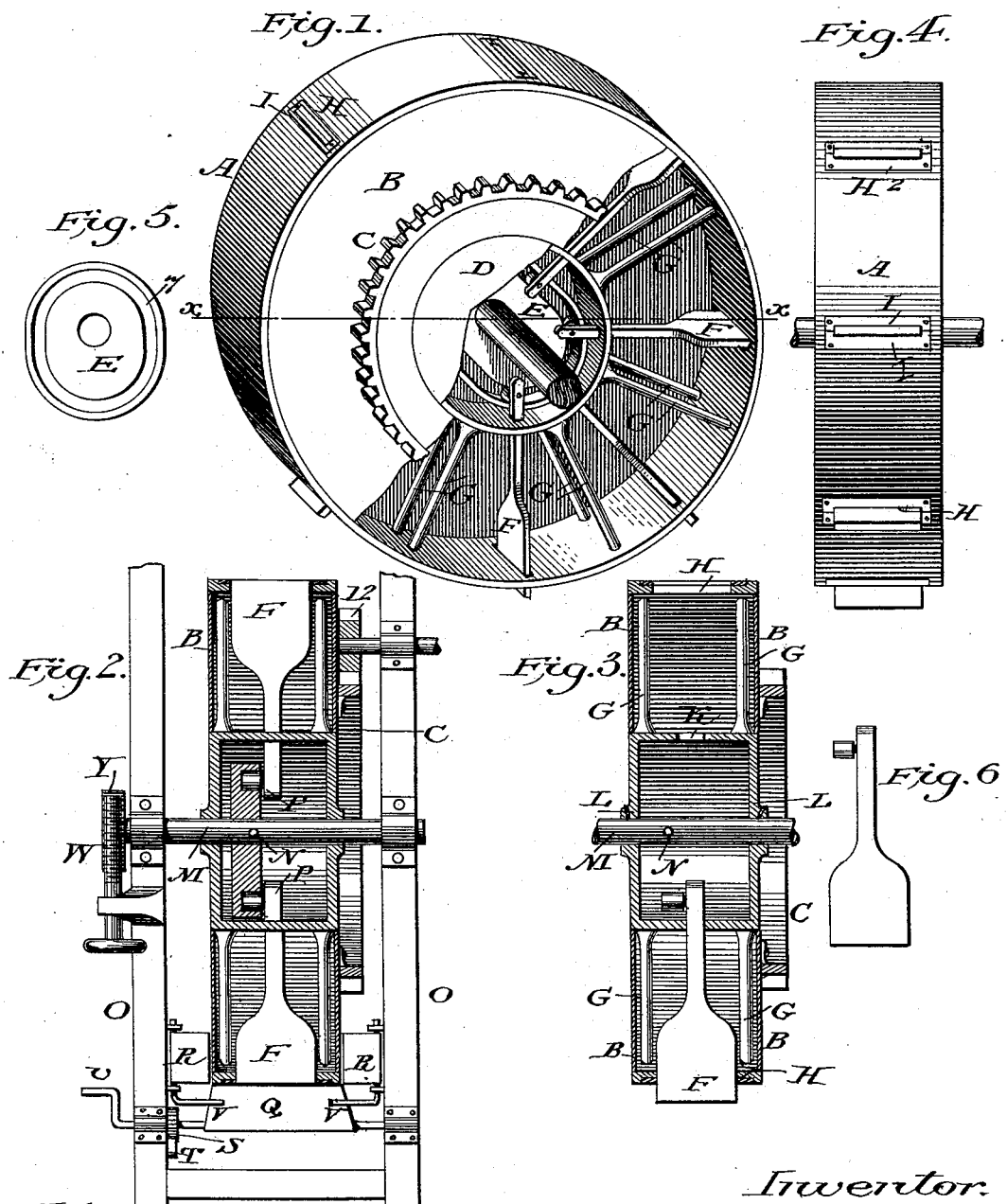

UNITED STATES PATENT OFFICE.

JOHN P. T. DAVIS, OF ELK CITY, KANSAS.

DRIVE-WHEEL FOR HARVESTERS OR BINDERS.

SPECIFICATION forming part of Letters Patent No. 508,167, dated November 7, 1893.

Application filed April 23, 1891. Serial No. 390,209. (No model.)

*To all whom it may concern:*

Be it known that I, JOHN P. T. DAVIS, a citizen of the United States, residing at Elk City, in the county of Montgomery and State of Kansas, have invented certain new and useful Improvements in Drive-Wheels for Harvesters or Binders, of which the following is a specification.

My invention relates to mechanism to be applied to the main wheel of harvesting machines and its object is to prevent such wheel from bagging down or slipping in swampy or soft soil while the machinery is being operated. The efficiency of such machine depends on whether the wheel while passing through mud and water prevents the mud from closing in over the rim of the wheel, which must inevitably stop the wheel and other machinery. To obviate this, my invention provides a wheel completely closed from the hub to the rim of the wheel by means of metallic disks fastened to the spokes, and for the purpose of preventing mud from being carried over the wheel, there is a series of scrapers which are attached to the frame of the machine in such a manner that both sides and the tire are scraped simultaneously. For the purpose of preventing slipping and rotating the wheel there is provided a series of radial plungers automatically moved outward from and inward toward the center of the wheel, by mechanism within the hub.

The invention is fully described and explained in this specification and shown in the accompanying drawings, in which—

Figure 1, represents a perspective view of the wheel, with a part of the hub and side casing off, showing the plate and annular groove and anti-friction pulley attached to the inner end of the plunger, within the hub, also shows the spur wheel as fastened to the side of the wheel, also three plungers as they protrude through the tire of the wheel, also adjustable slot plates as placed on the tire. Fig. 2, is a vertical cross-section of the main wheel taken on the line *x—x* of Fig. 1. Fig. 3, is a vertical cross-section of the main wheel with annular groove plate and plunger detached. Fig. 4, is a plain section of the tire of main wheel, showing holes through the tire through which the plungers protrude, the said holes being sunk or recessed for the purpose of receiving adjustable slot plates. Fig. 5, is a plain front view of plate E and annular groove therein. Fig. 6, is a plain view of plunger and anti-friction pulley attached to the end.

Like letters and numerals refer to like parts throughout the several views.

In the drawings A represents the tire of the main wheel; B, the side casing of the main wheel; C, the spur wheel as attached to the side of main wheel outside of the casing, B. Said wheel, C, engages with pinion, 12, and operates the other parts of the binder.

D, is the hub, made of iron, hollow and large, the hollow, large enough to contain and allow the free working within of the plate E containing annular groove, 7, with anti friction pulleys P, attached to the end of all plungers, F, working in groove, as the hub and main wheel revolve on the axle tree, M, as at L, L, in Fig. 3. Plate E is rigidly fixed to axle-tree M, by pin as at N, Fig. 2, and is closed in by hub. Large holes are made through the periphery of the hub corresponding with the number of plungers to be used. The holes are made large for the double purpose of admitting the end of the plunger F with the pulley P, attached and to be placed in the groove, 7, substantially and for the purpose set forth. Secondly the holes are recessed for the purpose of receiving the slat plates I I, which are made of hardened metal, and made to adjust and fit closely to the stem of plunger F and made a part of the hub, by bolting them fast.

This wheel is formed of central hub D, spokes G, and broad tire, A. The spokes, G, are made to fast the periphery of the hub, D, at both sides or ends of the hub the spokes being placed alternately so they do not stand opposite on the hub, thus strengthening the wheel. The outer ends of spokes are made fast to the tire, A, thus completing the wheel. At the center of the hub D, the ends are made thick so as to make a sufficient bearing for the axle, as at L L Fig. 3, the center hole being large enough for the axle tree M, to pass through. Casing, B, made of extra heavy sheet iron completely filling in the space between the hub D and tire A thus making the wheel solid as it were, at both sides from center to circumference is made fast to the spokes G thus preventing the clogging of the wheel by mud.

To prevent the slipping of the main wheel there is provided a set of plungers F which at certain times protrude from suitable slots made in the tire. These plungers protrude one at a time, as they by the revolution of the wheel are brought near the ground. They remain out until as the wheel rolls they are pressed down into solid earth. When the wheel has rolled over them far enough that they rise above the soil they at once recede to even with the face of the tire A. Hence there are but three plungers protruding at the same time. The plungers, at their outer ends, work in a closely fitting adjustable slot in the tire made by adjustable slot plates I I, made of metal, made harder than the ordinary rim, to prevent rapid wear, by friction. The slats fit close for the purpose of preventing soil that adheres to the plungers from being drawn inside of the wheel. The plungers, at their inner end are held in place, by slat, K, made in hub as slot, H, in tire.

The plungers, F, are actuated, as the wheel revolves on the axle tree, M, directly by means of anti friction pulley, P, attached to their inner end engaging with and working in annular groove, 7, in plate E. The plate E, is rigidly fixed to axle, M, within hub by pin through it as at N, Fig. 2, and is held in the desired position, by spur, y, fastened on end of axle M and engaging with worm W, attached to the frame of the machine as in Fig. 2.

The slot H through the tire, A, and in which the outer end of plunger F, works, is made as shown in Fig. 4. The large hole H², is recessed, for the purpose of permitting the adjustable slot plates I I, to be fitted close and the plates are smooth with and a part of the face of the tire. Slot, J, represents the slot after the plates I I have been bolted down in hole H², Fig. 4.

Corresponding slots, through the tire with those in the periphery of the hub, are made the bearings for plungers F, for the purpose of holding them, in direct line with plate E and directing their motion. From the nature of the work performed by the plungers, it is obvious that there is great friction in the bearings, and that the wear will be great, and the plungers liable to get out of line with plate E and to obviate this difficulty, I make the slots and bearings with adjustable slot plates I I said plates to be made of hardened metal, and made interchangeable, so that if much worn they can be replaced, or closed up to prevent mud adhering to plungers being drawn into wheel as the plungers recede. When the wheel is placed in the binder, the ends of axle are held in place by journal boxes, bolted on either upper or lower side of the frame, O. The axle works loose in boxing but is held rigid by a lever, or worm and spur attachment as shown at W, and Y, Fig. 2. The plate E being rigid on the axle, its position within the hub is regulated by a movement of the axle. That part of the hub L L, bearing and revolving on the axle, is provided with oiling places for the purpose of lubricating the same. For the prevention of mud being carried over by the revolution of the wheel, there are attached to each side of frame, O, scrapers R, R, and scraper Q is hinged across frame O and behind the main wheel in such manner that the rods on which scrapers R, R, are fastened will rest on scraper Q, as at v, v. When the handle U of scraper Q is turned, the three scrapers will simultaneously scrape the face and sides of the main wheel. The scrapers are held in place by ratchet S and pawl T, fast on frame O.

I am aware that it has been proposed to provide a traction wheel with a series of radial arms adapted to be projected or retracted, and an adjustable cam, engaging indirectly with said arm by lever toothed segments and rack on the inner end. I am also aware that it has been proposed to actuate anchoring blades by means of a cross head at their inner ends, said cross head having two bearings in disks, the cross head carrying a roller on the outer end, to engage with and be actuated by an adjustable way attached to the frame of the machine. I am also aware that it is proposed to provide wheels with flanges to prevent the earth from working on to the rim. So far as I know however, it is wholly new in such a structure to fasten on the said arms or plungers, at their inner end, an anti friction pulley or roller, and combining the same with an annular groove, within a plate rigidly fixed to the axle, and working within the hub of the wheel and the said plungers are actuated directly from the annular groove and caused to protrude or recede, and so far as I know it is wholly new to form a wheel with the sides entirely closed up and containing the actuating device entirely within the hub. So far as I know it is entirely new to form slots in both the hub and tire by means of adjustable and interchangeable slot plates made close fitting and of hardened metal, for the purpose of preventing rapid wear.

What I claim as new, therefore, and desire to secure by Letters Patent, is—

1. A main wheel for harvesters having perforated tire, A, inclosed hub, D, also perforated, plungers, F, provided with rollers, P, on the inner ends working in groove, 7, of cam plate, E, shaft, M, to which plate E, is rigidly attached, and the worm gear, Y, and W, for adjusting the cam plate substantially as described.

2. The wheel for harvesters hereinbefore described having the tire provided with openings for the passage of the plungers, F, and the plates I, I, countersunk in the tire, all as set forth.

3. The wheel for harvesters hereinbefore described having the inclosed hub, D, plates, B, cam plate, E, in hub D, and the plungers, F, and mechanism for adjusting the plungers, substantially as described.

JNO. P. T. DAVIS.

Witnesses:
LLOYD HANCOCK,
J. P. SWATZELL.